(12) United States Patent
Anders et al.

(10) Patent No.: US 9,940,236 B2
(45) Date of Patent: Apr. 10, 2018

(54) POINTER CHASING ACROSS DISTRIBUTED MEMORY

(71) Applicant: Intel Corporation, Santa Clara, CA (US)

(72) Inventors: Mark A. Anders, Hillsboro, OR (US); Himanshu Kaul, Portland, OR (US); Gregory K. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 14/573,968

(22) Filed: Dec. 17, 2014

(65) Prior Publication Data

US 2016/0179670 A1 Jun. 23, 2016

(51) Int. Cl.
*G06F 12/08* (2016.01)
*G06F 12/0806* (2016.01)
*G06F 12/0893* (2016.01)
*G06F 12/0817* (2016.01)

(52) U.S. Cl.
CPC ...... *G06F 12/0806* (2013.01); *G06F 12/0824* (2013.01); *G06F 12/0893* (2013.01); *G06F 2212/1021* (2013.01); *G06F 2212/284* (2013.01); *G06F 2212/608* (2013.01); *Y02D 10/13* (2018.01)

(58) Field of Classification Search
CPC .... G06F 15/7825; G06F 12/10; G06F 15/173; G06F 12/0813; G06F 12/0817; G06F 12/0831; G06F 12/0833; G06F 12/0842; G06F 13/14; G06F 12/084; G06F 2212/62; G06F 12/0815; G06F 12/0811; G06F 2212/621; G06F 2212/283; G06F 12/0891; G06F 2212/6042; G06F 13/1663
See application file for complete search history.

(56) References Cited

U.S. PATENT DOCUMENTS 8,284,766 B2 10/2012 Anders et al.
2009/0063817 A1 3/2009 Arimilli et al.
(Continued)

FOREIGN PATENT DOCUMENTS

WO 2006106475 A1 10/2006
WO WO 2014/209391 12/2014

OTHER PUBLICATIONS

Anders, et al., "A 2.9Tb/s 8W 64-Core Circuit-Switched Network-on-Chip in 45 nm CMOS," IEEE, 2008, 978-1-4244-2362-0/08 (pp. 182-185).
(Continued)

*Primary Examiner* — Reginald G Bragdon
*Assistant Examiner* — Thanh D Vo
(74) *Attorney, Agent, or Firm* — Alliance IP, LLC

(57) ABSTRACT

A first pointer dereferencer receives a location of a portion of a first node of a data structure. The first node is to be stored in a first storage element. A first pointer is obtained from the first node of the data structure. A location of a portion of a second node of the data structure is determined based on the first pointer. The second node is to be stored in a second storage element. The location of the portion of the second node of the data structure is sent to a second pointer dereferencer that is to access the portion of the second node from the second storage element.

20 Claims, 8 Drawing Sheets

(56) References Cited

U.S. PATENT DOCUMENTS

| | | | |
|---|---|---|---|
| 2009/0182954 A1* | 7/2009 | Mejdrich | G06F 12/0808 |
| | | | 711/141 |
| 2010/0064123 A1* | 3/2010 | Zuraski, Jr. | G06F 9/3844 |
| | | | 712/239 |
| 2011/0216773 A1* | 9/2011 | Vegesna | H04L 12/56 |
| | | | 370/395.4 |
| 2012/0278335 A1* | 11/2012 | Bentkofsky | G06F 17/30327 |
| | | | 707/743 |
| 2014/0156929 A1 | 6/2014 | Falsafi et al. | |
| 2014/0204764 A1 | 7/2014 | Kumar et al. | |
| 2014/0281243 A1 | 9/2014 | Shalf et al. | |
| 2015/0071282 A1 | 3/2015 | Anders et al. | |
| 2015/0188829 A1 | 7/2015 | Satpathy et al. | |
| 2015/0220470 A1 | 8/2015 | Chen et al. | |

OTHER PUBLICATIONS

Anders et al., "A 4.1Tb/s Bisection-Bandwidth 560Gb/s/W Streaming Circuit-Switched 8×8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

Chen et al., "A 340mV-to-0.9V 20.2Tb/s Source-Synchronous Hybrid Packet/Circuit-Switched 16×16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

International Search Report and Written Opinion in International Application No. PCT/US2015/061467 dated Mar. 4, 2016.

\* cited by examiner

POINTER CHASING ACROSS DISTRIBUTED MEMORY

FIELD

The present disclosure relates in general to the field of computer development, and more specifically, to pointer chasing across distributed memory.

BACKGROUND

Networks-on-Chip (NoCs), for on-die communication between cores, are important in enabling scalable performance as the number of cores increases in multi-core processors and SOCs. Multi-core processors are often organized as an array of processors coupled with a local cache. The processor-level cache memory may be distributed across the die and accessed using an NoC. Complex data structures such as graphs, trees and linked-lists may be distributed among the processor-level cache memory. Accessing a node from one of these data structures may involve performing multiple pointer-dereferences. These sequential pointer dereferences are often referred to as pointer chasing.

BRIEF DESCRIPTION OF THE DRAWINGS

Like reference numbers and designations in the various drawings indicate like elements.

DETAILED DESCRIPTION

Figure 1:
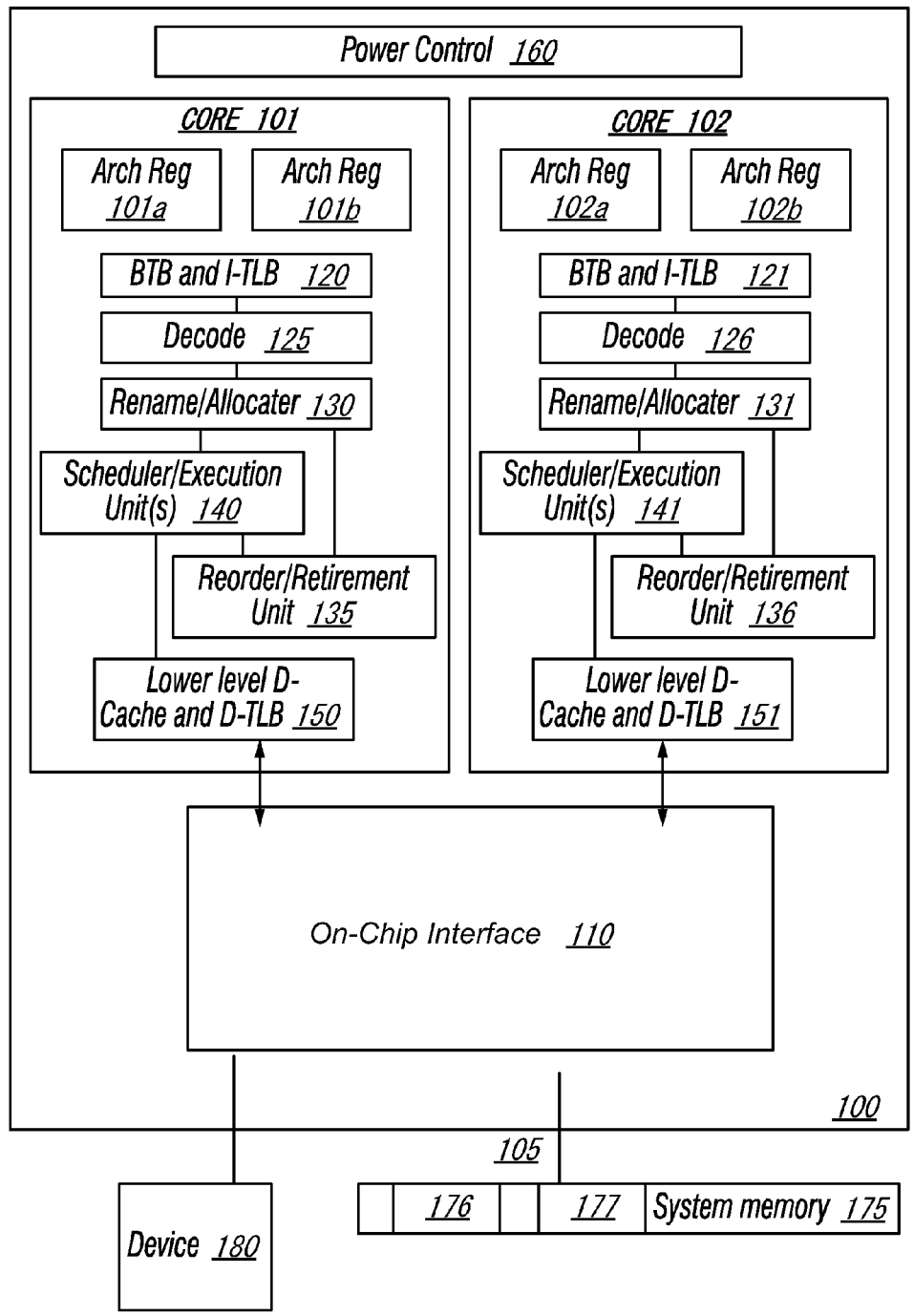
FIG. 1 illustrates a block diagram for an example computing system including a multicore processor in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
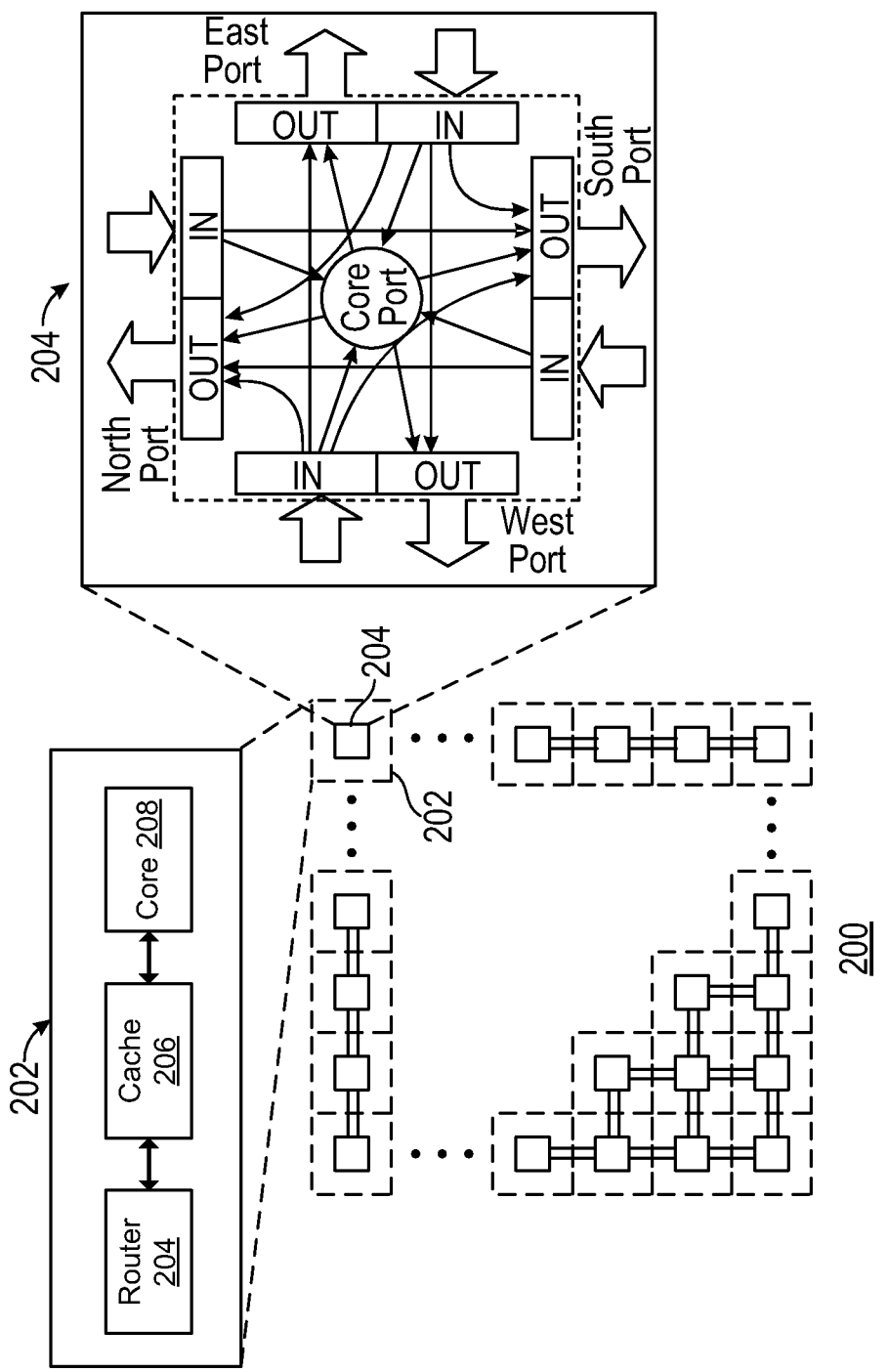
FIG. 2 illustrates a block diagram of a processor comprising a network on a chip (NoC) system including a plurality of routers in accordance with certain embodiments.

FIG. 2 illustrates a block diagram of a processor 200 comprising a network on a chip (NoC) system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, a system on a chip (SOC), or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network), sizes, bus widths, and processes. Each network element 202 includes a router 204. The routers 204 may be communicatively linked with one another in a network, such as a packet-switched network and/or a circuit-switched network, thus enabling communication between the processing elements (e.g., cores 208) of processor 200.

Each router 204 may be communicatively coupled to its own core 208, cache 206, and/or other processing or storage element. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated processing elements). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse a same link or interconnect.

In an embodiment, routers of processor 200 may be variously provided in two networks or communicate in two networks, such as a packet switched network and a circuit switched network. Such a communication approach may be termed a hybrid packet/circuit-switched network. In such embodiments, packets may be variously communicated among the various routers 204 using resources of the packet switched network and the circuit switched network. In order to transmit a single data packet, the circuit switched network may allocate an entire path, whereas the packet switched network may allocate only a single segment (or interconnect). In some embodiments, the packet switched network may be utilized to reserve resources of the circuit switched network for transmission of data between routers 204.

Router 204 may include a plurality of ports to variously couple to and communicate with adjoining network elements 202. For example, circuit switched and packet switched signals may be communicated through these ports. Ports of router 204 may be logically divided, for example, according to the direction of adjoining network elements and/or the direction of traffic exchanges with such elements. For example, router 204 may include a north port with input and output ports configured to (respectively) receive communications from and send communications to a network element located in a "north" direction with respect to router 204. Additionally or alternatively, router 204 may include similar ports to interface with network elements located to the south, west, east, or other direction. In the embodiment depicted, router 204 is configured for X, Y routing wherein data moves first in the East/West direction and then in the North/South direction. In other embodiments, any suitable routing scheme may be used.

In various embodiments, router 204 further comprises another input port and an output port configured to receive and send (respectively) communications with another agent of the network. In one embodiment, these ports are for communications with processor logic of a "local" core 208 which includes, is adjacent to, is in communication with, or is otherwise associated with router 204. In another embodiment the ports are for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. In an embodiment, each router 204 has a unique clock and voltage.

Figure 3A:
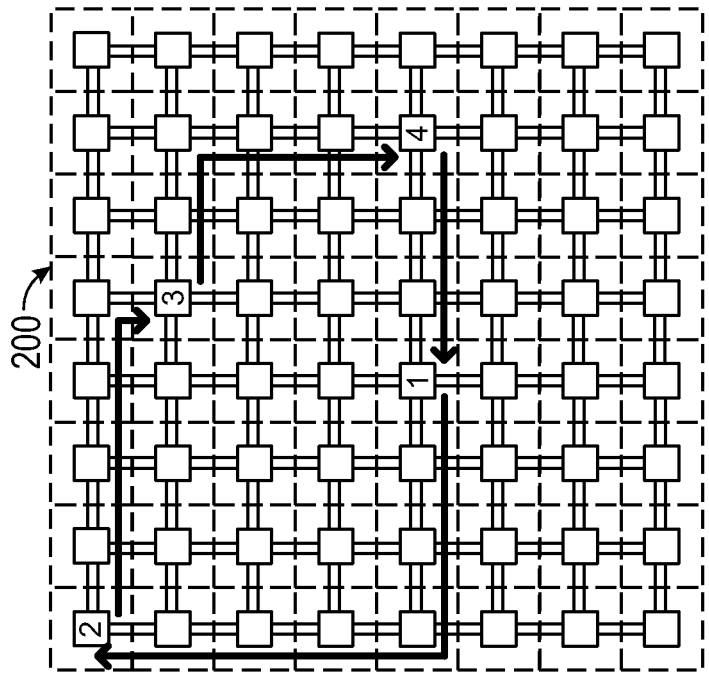
FIGS. 3A and 3B illustrate example traversals of an NoC during pointer chasing in accordance with certain embodiments.
Figure 3B:
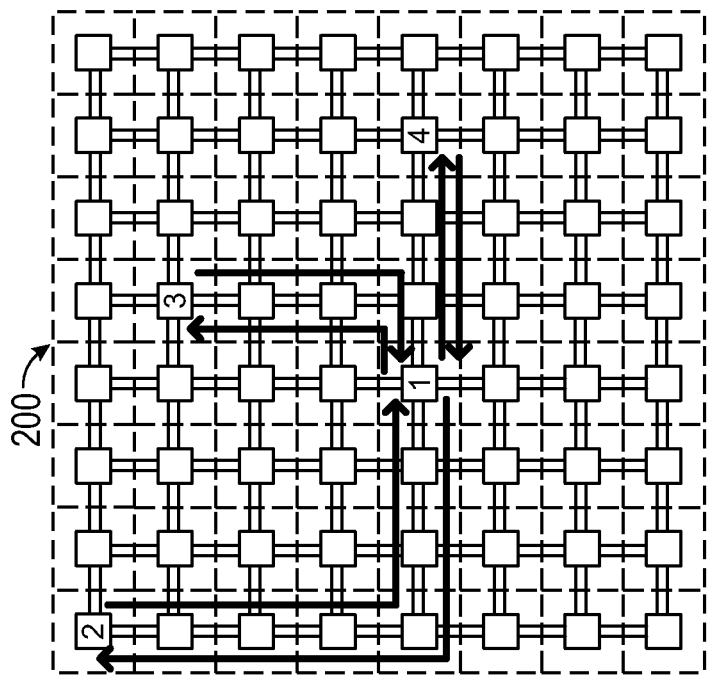

FIGS. 3A and 3B illustrate example traversals of an NoC during pointer chasing in accordance with certain embodiments. In these embodiments, processor 200 is shown as an 8×8 array of network elements. The network elements depicted may have any of the characteristics described herein with respect to network element 202. In these example embodiments, nodes of a data structure are distributed among network elements 2, 3, and 4. A node of a data structure may include a data portion and one or more pointers to one or more other nodes of the data structure. Each network element may store any number of nodes of the data structure via a cache or other storage element located within or otherwise associated with the network element.

In the embodiment depicted, network element 1 is a source of a request to access a data portion of a node of the data structure. As an example, a core 208 located within or otherwise associated with network element 1 may generate the request. In order to access a data field of a desired node of a data structure, various nodes of the data structure may need to be traversed, and pointers of the nodes may need to be dereferenced in order to determine the location of the desired node.

In the example shown, network elements 2, 3, and 4 each store a portion of the data structure. That is, each network element may include a cache or other storage element that stores one or more nodes of the data structure. In the example shown, each network element includes a node of the data structure that is accessed during fulfillment of a request to access a particular node of the data structure. Network element 2 may include the first node of the data structure. The first node of the data structure may include a pointer to a second node of the data structure stored at network element 3. The second node of the data structure may include a pointer to a third node of the data structure stored at network element 4. The third node of the data structure may include the node that the source intends to access.

In the traversal shown in FIG. 3A, network element 1 (e.g., via a core 208) performs all of the pointer dereferencing. Network element 1 sends a request specifying the address of the first node of the data structure to network element 2. Information from the first node is returned to network element 1. From this information, network element 1 determines that the next node that should be accessed is located at network element 3. Network element 1 sends a request specifying the address of the second node of the data structure to network element 3. Information from the second node is returned to network element 1. From this information, network element 1 determines that the next node that should be accessed is located at network element 4. Network element 1 then sends a request specifying the address of the third node of the data structure to network element 4 and network element 4 returns the data field of the third node to network element 1. The paths shown (represented by the arrows) are merely for illustrative purposes to demonstrate the distance that must be traveled (e.g., if x,y routing is used, the actual paths taken will be different).

As may be seen from the example of FIG. 3A, when large or complex data structures (e.g., graphs, linked lists, trees, etc.) include nodes that are distributed across many distinct storage elements (e.g., caches 206), accessing the data may involve multiple reads from many different storage elements. When using the traversal method depicted in FIG. 3A, the delay for these accesses includes many round-trip latencies from the source of the request, resulting in worse performance and increased network traffic and power consumption.

In the example of FIG. 3B, round-trip traversals are avoided by implementing network elements that each include logic to perform dereferencing of pointers in data structures. As an example, such logic may be located within a router 204 or core 208 of the network element or may be logic in communication with the router 204 or core 208 of the network element. The traversal begins as a source at network element 1 sends a request to network element 2. The request may include information about which fields of the nodes of a data structure to access. As one example, the request may include one or more offsets that indicate these fields. Network element 2 receives the request and accesses a pointer of the first data structure node. From this pointer, network element 2 determines where the next node of the data structure is located and forwards information from the request on to network element 3. Network element 3 similarly dereferences the pointer from the appropriate node and forwards the relevant information to network element 4. Based on the information received, network element 4 accesses the data field of the desired node and sends the data field to network element 1.

As illustrated, the traversal method shown in FIG. 3B avoids the need for many round-trip traversals and thereby reduces network traffic, power consumption, and latency. As the size of the data structure and the number of different storage elements among which the data structure is distributed grows, the benefits of this traversal method will scale. In the simple embodiments depicted, the round-trip method depicted in FIG. 3A results in traversal of 28 hops between network elements while the traversal path shown in FIG. 3B results in traversal of only 20 hops, thus reducing the latency significantly.

Figure 4:
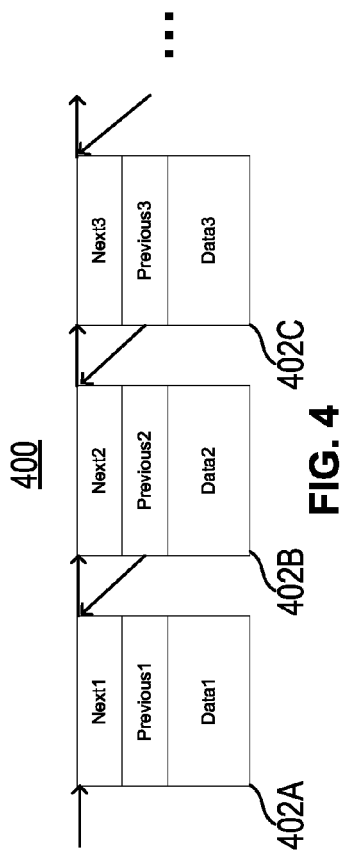
FIG. 4 illustrates an example double linked list data structure in accordance with certain embodiments.

FIG. 4 illustrates an example double linked list data structure 400 in accordance with certain embodiments. Double linked list 400 includes any suitable number of nodes 402. Each node 402 includes a next pointer field, a previous pointer field, and a data field. The next pointer field includes the memory location of the next node 402 of the double linked list 400. The previous pointer field includes the memory location of the previous node 402 of the double linked list 400. The data field includes the data stored by the node 402. Node 402A is the first node of the double linked list 400. As depicted, the next pointer field of 402A points to the start location of node 402B, and the next pointer field of 402B points the start location of node 402C, and so on. The previous pointer field of node 402C points to the start location of node 402B, and the previous pointer field of node 402B points to the start location of node 402A.

A desired node may be accessed by accessing a node 402 of the list 400 and then navigating to the desired node through the next or previous pointers of the nodes 402. As described above, nodes 402 of the linked list 400 may be distributed among different storage elements, such as caches of a processor die. Referring back to the example of FIG. 3B, node 402A may be located in a storage element associated with network element 2, node 402B may be located in a storage element associated with network element 3, and node 402C may be located in the storage element associated with network element 4. In this example, node 402C may include the data field sought by network element 1. To obtain this data, network element 1 sends the start address of the linked list (e.g., the start address of node 402A) to network element 2 along with an indication that node 402C is sought. The indication may include any suitable information that allows retrieval of the data field of node 402C. As an example, the indication may denote that the next pointer of node 402A should be dereferenced, node 402B accessed, the next pointer of node 402B dereferenced, node 402C accessed, and the data field of node 402C returned to network element 1. In some embodiments, the indication may include one or more offsets that may be used in conjunction with the start address of the first node accessed. The addresses and offsets specified in requests and the addresses stored in pointer fields may be any suitable size. In some embodiments, the offsets are smaller than the addresses stored in the pointer fields or specified in the request from the source. As an example, an address may be four or eight bytes and the offsets may be smaller than four or eight bytes. In other embodiments, the addresses and offsets are the same size. In particular embodiments, an offset received in the requests may be modified by the receiving router to yield a value that should be added to an address obtained from the pointer fields. For example, an offset received in a request may be truncated or undergo binary shifting before being added to an address.

Although each field of the nodes 402 may be any suitable size, for purposes of illustration each field will be considered to comprise 4 bytes. Thus, the request from network element 1 may indicate offsets of 0 bytes, 0 bytes, and 8 bytes, indicating that the next pointer of node 402A, the next pointer of node 402B, and the data field of node 402C should be accessed. If instead the data field node 402B were desired, the request from element 1 might indicate offsets of 0 bytes and 8 bytes. If the linked list 400 were to be traversed backwards from node 402C to access the data field of node 402A, the request from network element 1 would instead be sent to network element 4 and would indicate the start address of node 402C with offsets of 4 bytes, 4 bytes, and 8 bytes in order to access the previous pointers of nodes 402C and 402B and the data portion of node 402A.

Figure 5:
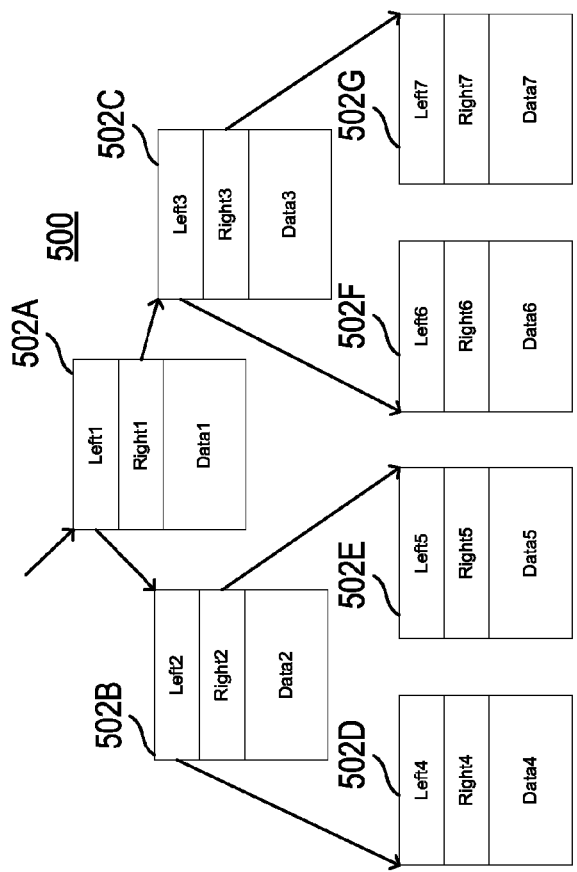
FIG. 5 illustrates an example tree data structure in accordance with certain embodiments.

FIG. 5 illustrates an example tree data structure 500 in accordance with certain embodiments. Tree 500 includes any suitable number of nodes 502. Each node 502 includes a left pointer field, a right pointer field, and a data field. The left pointer field includes the memory location of the node 502 to the left of the node, while the right pointer field includes the memory location of the node 502 to the right of the node. The data field includes the data stored by the node 502. Node 502A is the first node of the tree 500. As depicted, the left pointer field of 502A points to the start location of node 502B, and the right pointer field points to the start location of node 502C. The left pointer field of 502B points to the start location of node 502D, and the right pointer field points to the start location of node 502E. The left pointer field of 502C points to the start location of node 502F, and the right pointer field points to the start location of node 502G.

A desired node may be accessed by accessing a node 502 of the tree 500 and then navigating to the desired node through the left or right pointers of the nodes 502. As described above, nodes 502 of the graph 500 may be distributed among different storage elements, such as caches of a processor die. Referring back to the example of FIG. 3B, node 502A may be located in a storage element associated with network element 2, node 502C may be located in a storage element associated with network element 3, and node 502F may be located in the storage element associated with network element 4. In this example, node 502F may include the data field sought by network element 1. To reach this data, network element 1 sends the start address of the graph (e.g., the start address of node 502A) to network element 2 along with an indication that node 502F is sought. The indication may include any suitable information that allows retrieval of the data field of node 502F. As an example, the indication may denote that the right pointer of node 502A should be dereferenced, node 502C accessed, the left pointer of node 502C dereferenced, node 502F accessed, and the data field of node 502F returned to network element 1. As mentioned above, the indication may include one or more offsets that may be used in conjunction with the start address of the first node accessed. As in the example above, although the fields of the data structures may be any suitable size, each field will be considered to comprise 4 bytes. Thus, the request from network element 1 may indicate offsets of 4 bytes, 0 bytes, and 8 bytes, indicating that the right pointer of node 502A, the left pointer of node 502C, and the data field of node 502F should be accessed. If instead the data field node 502B were desired, the request from element 1 might indicate offsets of 0 bytes and 8 bytes.

Figure 6:
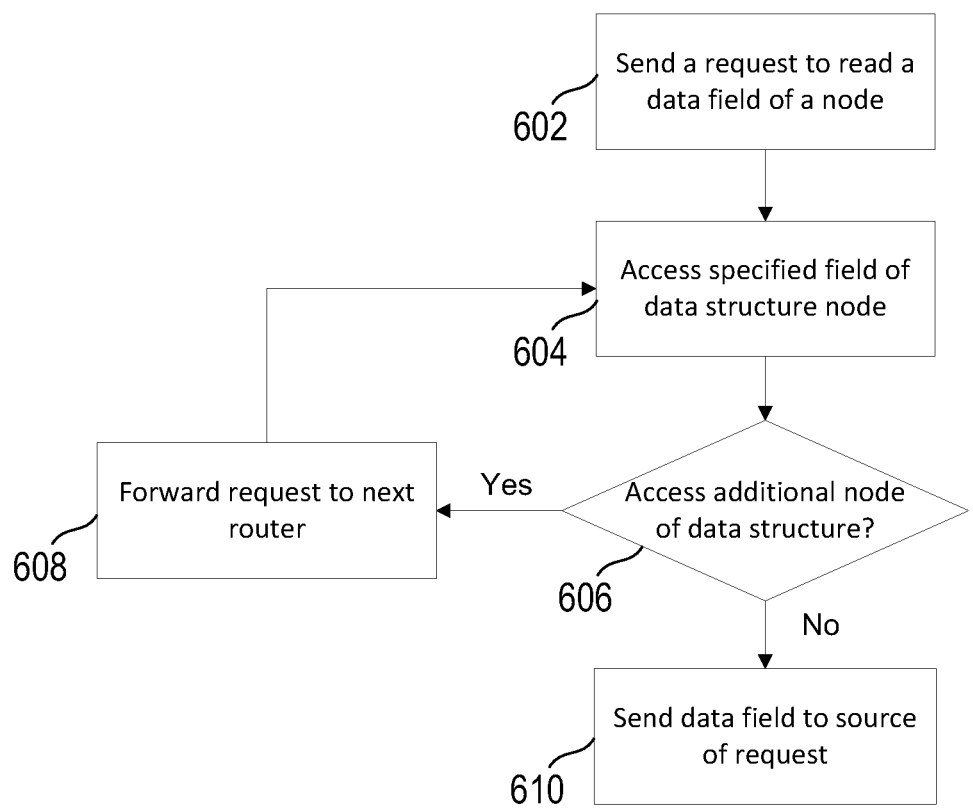
FIG. 6 illustrates an example method for traversing an NoC during pointer chasing in accordance with certain embodiments.

FIG. 6 illustrates an example method for traversing an NoC during pointer chasing in accordance with certain embodiments. At step 602, a request is sent from a core 208 to a network element 202 associated with an identified node in the request. The request includes information enabling the NoC to access the data field of a data structure node indicated by the request and send the data field to the core 208. The request may include an address of the first node to be accessed. The first node may be the first node of the data structure or another node of the data structure that has a location known to the core. Before sending the request, the core 208 or associated logic may determine the location of the cache that stores the first node to be accessed. The request is then sent to the network element 202 associated with the cache. The request may be received by a router of the network element.

At step 604, a field of the first node is accessed. The field may be accessed by reading the cache at a location specified by the request. The memory location specified in the request is accessed at step 604. If the request involves pointer chasing, the contents of the first memory location will be a pointer field of the first node and the request will include an indication that one or more further nodes should be accessed before sending data back to the core 208 that originated the request. Accordingly, at step 606 it will be determined that at least one additional node of the data structure should be accessed. At step 608, the request is forwarded to the network element associated with a cache that stores the additional node. If the cache that was recently accessed holds the additional node then that cache will be accessed again and the request will be forwarded when a pointer to a node at a different network element is received. Before the request is forwarded, it may be modified to reflect the one or more accesses that occur at the cache. For example, the address specified by the request may be omitted in the forwarded request and a new address based on the pointer may be included. The collection of offsets included in the request may be modified as well. For example, if one of the offsets is added to the pointer to obtain the new address that is forwarded, this offset may be removed from the request before the request is forwarded to the next network element. Steps 604, 606, and 608 are repeated until additional nodes of the data structure do not need to be accessed (i.e., the data field of the desired node has been accessed). This may be determined in any suitable manner. For example, if no offsets remain in the request received at the last network element, the router of the last network element may determine that the data field has been obtained. The data field is then sent back to the requesting core 208 at step 610.

Some of the steps illustrated in FIG. 6 may be combined, modified or deleted where appropriate, and additional steps may also be added to the flowchart. Additionally, steps may be performed in any suitable order without departing from the scope of particular embodiments.

Figure 7:
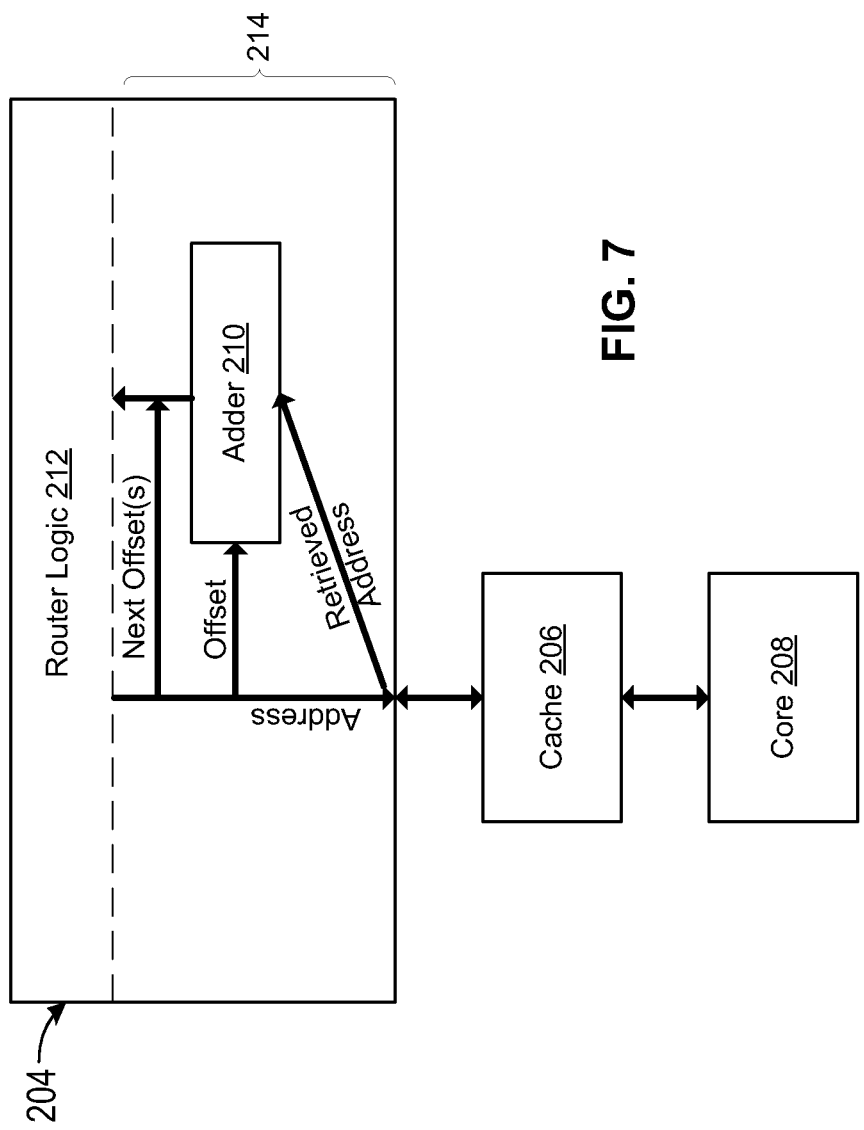
FIG. 7 illustrates an example router for pointer chasing in accordance with certain embodiments.

FIG. 7 illustrates an example router 204 for pointer chasing in accordance with certain embodiments. Router 204 includes router logic operable to allow circuit switched and/or packet switched data to be transmitted between network elements. Router 204 may also include a pointer dereferencer 214 operable to access a memory at an address, obtain a pointer to a node of a data structure, adjust the pointer to point to a desired field of the node, and construct a request that comprises the adjusted pointer.

Router 204 receives a request from a router associated with the source of the request. Router 204 identifies an address in the request and passes the address to the cache 206 to access the contents of the cache at that memory address. When the memory location of the cache 206 contains a pointer to the next node to be accessed, the router identifies the retrieved address and passes it to an adder 210. Adder 210 also receives an offset from the request that corresponds to the next location to be read. As explained earlier, this offset may represent the difference in bytes (or other suitable measure) between the start of the next node and the field of the next node that should be read. Adder 210 adds the retrieved address to the offset to generate the next memory location to read from. This address and any remaining offsets are combined to form the request that is forwarded to the network element associated with the cache that holds the next node.

Figure 8:
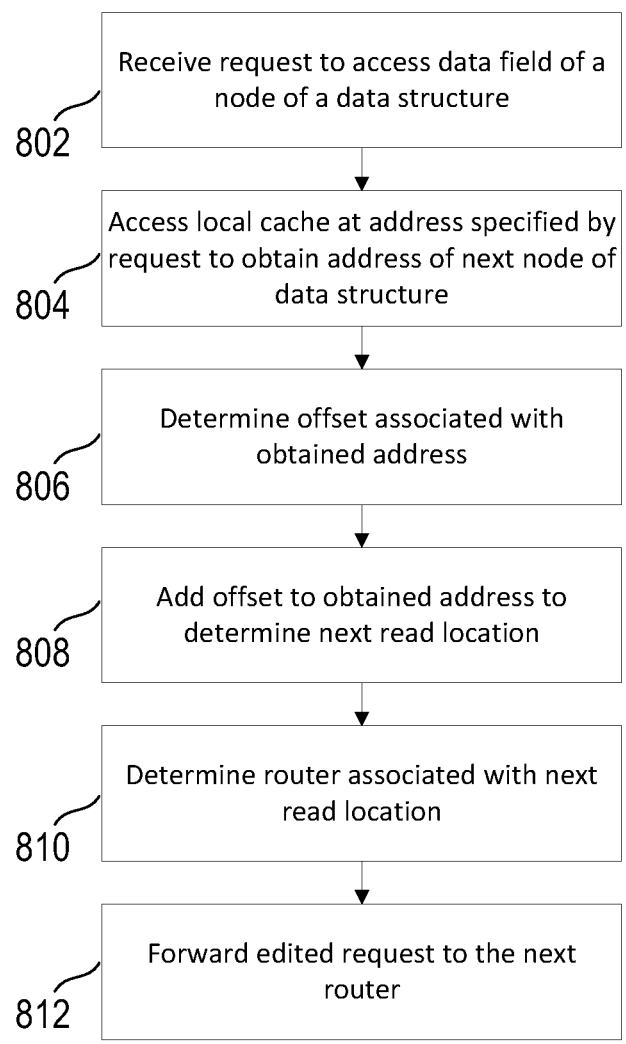
FIG. 8 illustrates an example method for retrieving a pointer and determining a next address during pointer chasing in accordance with certain embodiments.

FIG. 8 illustrates an example method 800 for retrieving a pointer and determining a next address during pointer chasing in accordance with certain embodiments. For illustrative purposes, the method is described from the perspective of router 204 of FIG. 7. At step 802, a request to access a data field of a node of a data structure is received at router 204. At step 804, a local cache 206 coupled to the router 204 is accessed using an address included in the request received by the router 204. This access yields an address of another node of the data structure. At step 806, the router determines an offset that is associated with the obtained address. In some embodiments, the offset will be the first offset listed in the request received by the router. At step 808, the offset is added to the address obtained from the cache to determine the next read location. At step 810, router 204 uses the resulting address to determine which router the request should be sent to. The router 204 may use any suitable method to determine the next router. In a particular embodiment, the router 204 performs a hash of the resulting address and selects the next router based on the result of the hash. The obtained address and any remaining offsets in the received request are then forwarded to the next router at step 812. In some instances, the next read location determined at step 808 may be located in the same local cache that was accessed to obtain the address of the next node of the data structure. Accordingly, steps 804 through 810 may be repeated at the same router before an edited request is forwarded to a different router at step 812.

Some of the steps illustrated in FIG. 8 may be combined, modified or deleted where appropriate, and additional steps may also be added to the flowchart. Additionally, steps may be performed in any suitable order without departing from the scope of particular embodiments. Moreover, steps of method 800 may be repeated any number of times. For example, any number of pointers may be dereferenced before the desired data field is obtained. Thus, although various embodiments depict three pointers, more or less pointers may be dereferenced to obtain the desired data field.

Although various embodiments are described with respect to an NoC, the concepts of this disclosure may be used in any system where nodes of a data structure are dispersed among different discrete memories. In such embodiments, each memory may be associated with a router that is operable to receive requests to access the memory, transmit requests to other routers, and send data back to the router where the request originated.

Figure 9:
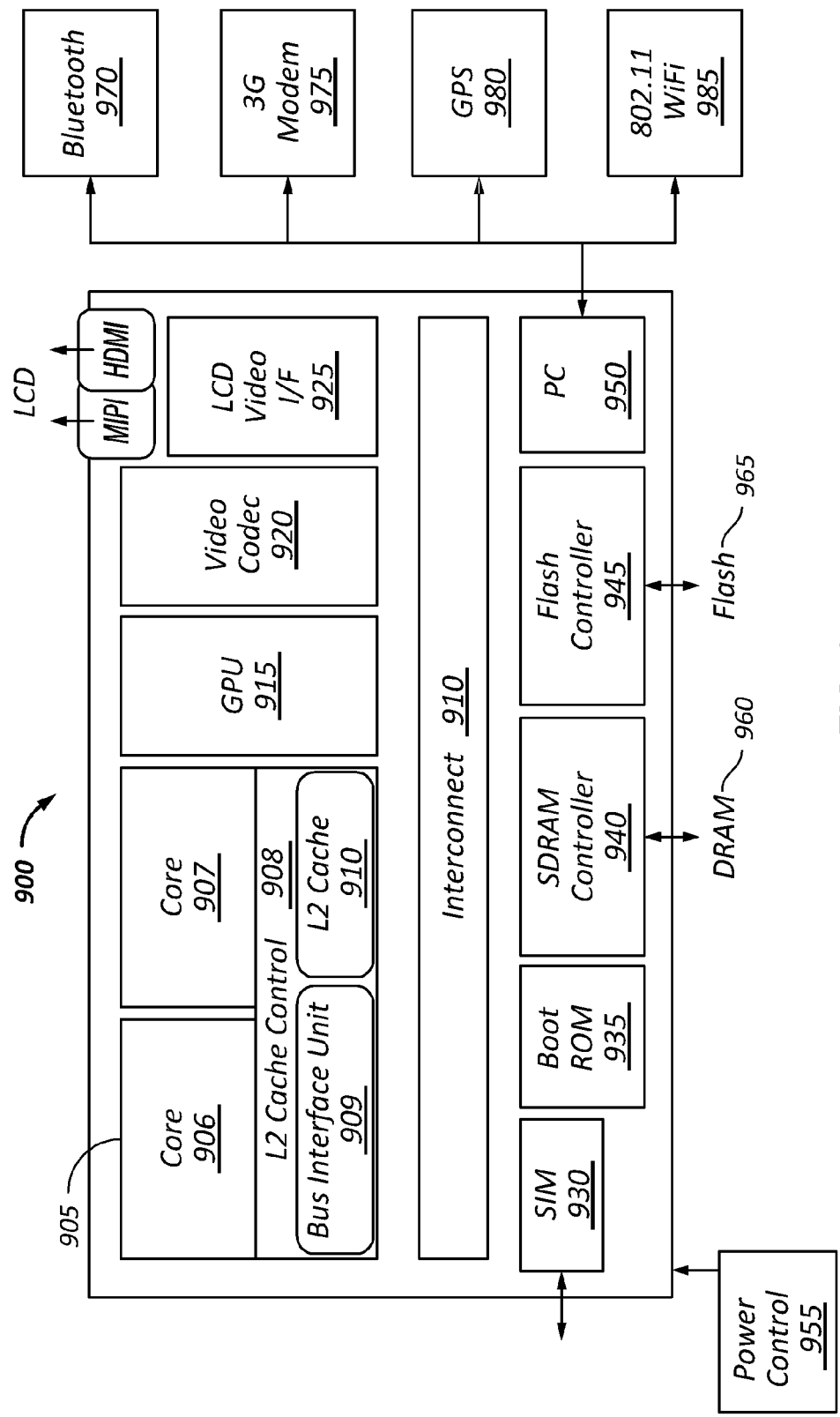
FIG. 9 illustrates another block diagram for an example computing system in accordance with certain embodiments.

FIG. 9 illustrates another embodiment of a block diagram for an example computing system in accordance with one embodiment. In this figure, an embodiment of a system on-chip (SOC) design in accordance with the disclosures is depicted. As a specific illustrative example, SOC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes 2 cores—906 and 907. Similar to the discussion above, cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 910 includes an on-chip interconnect, such as an IOSF, AMBA, or other interconnect discussed above, which potentially implements one or more aspects of the described disclosure.

Interface 910 provides communication channels to the other components, such as a Subscriber Identity Module (SIM) 930 to interface with a SIM card, a boot rom 935 to hold boot code for execution by cores 906 and 907 to initialize and boot SOC 900, a SDRAM controller 940 to interface with external memory (e.g. DRAM 960), a flash controller 945 to interface with non-volatile memory (e.g. Flash 965), a peripheral control Q1650 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein.

In addition, the system illustrates peripherals for communication, such as a Bluetooth module 970, 3G modem 975, GPS 985, and WiFi 985. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a router), and a method to access a first pointer of the data structure from a first cache of the plurality of caches at a first memory location to be specified by a first core of the at least one core; and send, to a second router that is to be in communication with a second cache of the plurality of caches, a second memory location based on the first pointer.

In at least one example, the apparatus may be a processor that is to comprise at least one core and a plurality of caches, wherein the data structure is to be distributed among the plurality of caches.

In at least one example, the second cache is to comprise a second pointer of the data structure at the second memory location.

In at least one example, the first core is to receive a data field of the data structure from a router that is to receive a memory location of the data field from another router.

In at least one example, the router that is to receive the memory location of the data field is the second router.

In at least one example, the router that is to receive the memory location of the data portion is a third router.

In at least one example, the first core is to send the first memory location as part of a request, the request further to comprise at least one offset.

In at least one example, the first router is to comprise an adder to add a first offset of the at least one offset to the first pointer to compute the second memory location.

In at least one example, the data structure is to comprise a linked list.

In at least one example, the data structure is to comprise a graph.

In at least one example, the data structure is to comprise a tree.

In at least one example, a processor is to further comprise at least one machine accessible storage medium having code stored thereon, the code when executed on a machine, causes the machine to cause the first router to access the first pointer of the data structure from the first cache of the plurality of caches at the first memory location to be specified by the first core of the at least one core and send, to the second router that is to be in communication with the second cache of the plurality of caches, the second memory location based on the first pointer.

One or more embodiments may provide an apparatus, a system, a machine readable storage, a machine readable medium, hardware- and/or software-based logic (e.g., a pointer dereferencer), and a method to receive a location of a portion of a first node of a data structure, the data structure to be stored among a plurality of storage elements, obtain a first pointer from the first node of the data structure, determine, based on the first pointer, a location of a portion of a second node of the data structure, the second node to be stored in a second storage element, and send the location of the portion of the second node of the data structure to a second pointer dereferencer that is to access the portion of the second node from the second storage element.

In at least one example, the first pointer dereferencer is to receive the location of the portion of the first node of the data structure from a core of a processor.

In at least one example, the second pointer dereferencer is to access a data field of the second node of the data structure.

In at least one example, the second pointer dereferencer is to send the data field of the second node of the data structure to a core of a processor.

In at least one example, the first pointer dereferencer is further to receive one or more offsets in a request also comprising the location of the portion of the first node of the data structure, and add a first offset of the at least one offset to the first pointer to determine the location of the portion of the second node of the data structure.

In at least one example, the first pointer dereferencer is further to send a request comprising the location of the portion of the second node of the data structure and a second offset of the one or more offsets to the second pointer dereferencer.

In at least one example, the second pointer dereferencer is further to obtain a second pointer from the second node of the data structure, determine, based on the second pointer, a location of a portion of a third node of the data structure, the third node to be stored in a third storage element, and send the location of the portion of the third node of the data structure to a third pointer dereferencer that is to access the portion of the third node from the third storage element.

In at least one example, the second pointer dereferencer is further to receive the second offset of the one or more offsets and the location of the portion of the second node of the data structure; and add the second offset to the second pointer to determine the location of the portion of the third node of the data structure.

One or more embodiments may provide a non-transitory machine readable medium including information to represent structures, when manufactured, to be configured to receive, at a first pointer dereferencer, a location of a portion of a first node of a data structure, the first node to be stored in a first storage element, obtain a first pointer from the first node of the data structure, determine, based on the first pointer, a location of a portion of a second node of the data structure, the second node to be stored in a second storage element, and send the location of the portion of the second node of the data structure to a second pointer dereferencer that is to access the portion of the second node from the second storage element.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor to comprise:
   at least one core;
   a plurality of caches, wherein a data structure is to be distributed among the plurality of caches; and
   a first router to:
   access a first pointer of the data structure from a first cache of the plurality of caches at a first memory location to be specified by a first core of the at least one core;
   in response to accessing the first pointer from the first cache, determine a second memory location based on the accessed first pointer; and
   send, to a second router that is to be in communication with a second cache of the plurality of caches, a second memory location based on the first pointer, wherein the second cache is to comprise a second pointer of the data structure at the second memory location, wherein the first pointer has a value that is different from a value of the second pointer.

2. The processor of claim 1, wherein the first core is to receive a data field of the data structure from a router that is to receive a memory location of the data field from another router.

3. The processor of claim 2, wherein the router that is to receive the memory location of the data field is the second router.

4. The processor of claim 2, wherein the router that is to receive the memory location of the data field is a third router.

5. The processor of claim 1, wherein the first core is to send the first memory location as part of a request, the request further to comprise at least one offset.

6. The processor of claim 5, wherein the first router is to comprise an adder to add a first offset of the at least one offset to the first pointer to compute the second memory location.

7. The processor of claim 1, wherein the data structure is to comprise a linked list.

8. The processor of claim 1, wherein the data structure is to comprise a graph.

9. The processor of claim 1, wherein the data structure is to comprise a tree.

10. The processor of claim 1, wherein the first memory location to be specified by the first core is a memory address that is distinct from a memory address specified by the first pointer.

11. The processor of claim 1, wherein a first node of the data structure is stored in the first cache and a second node of the data structure is stored in the second cache, wherein the first node of the data structure stores a first data field of the data structure and the first pointer, the first pointer comprising a memory address of the second node of the data structure, the second node of the data structure comprising a different data field of the data structure.

12. An apparatus to comprise:
a router comprising:
at least one input port and at least one output port;
router logic; and
a first pointer dereferencer;
wherein the router is to:
receive a location of a portion of a first node of a data structure, the data structure to be stored among a plurality of storage elements, the first node to be stored in a first storage element;
obtain a first pointer of the first node of the data structure from the first storage element;
in response to obtaining the first pointer from the first storage element, determine, based on the first pointer, a location of a portion of a second node of the data structure, the second node to be stored in a second storage element; and
send the location of the portion of the second node of the data structure to a second pointer dereferencer that is to access the portion of the second node from the second storage element, wherein the second node of the data structure is to store a second pointer, wherein the first pointer has a value that is different from a value of the second pointer.

13. The apparatus of claim 12, wherein the router is to receive the location of the portion of the first node of the data structure from a core of a processor.

14. The apparatus of claim 12, wherein the second pointer dereferencer is to access a data field of the second node of the data structure.

15. The apparatus of claim 14, wherein the second pointer dereferencer is to send the data field of the second node of the data structure to a core of a processor.

16. The apparatus of claim 12, wherein the router is further to:
receive one or more offsets in a request also comprising the location of the portion of the first node of the data structure; and
add a first offset of the at least one offset to the first pointer to determine the location of the portion of the second node of the data structure.

17. The apparatus of claim 16, wherein the router is further to send a request comprising the location of the portion of the second node of the data structure and a second offset of the one or more offsets to the second pointer dereferencer.

18. The apparatus of claim 12, wherein the second pointer dereferencer is further to:
obtain a second pointer from the second node of the data structure;
determine, based on the second pointer, a location of a portion of a third node of the data structure, the third node to be stored in a third storage element; and
send the location of the portion of the third node of the data structure to a third pointer dereferencer that is to access the portion of the third node from the third storage element.

19. The apparatus of claim 18, wherein the second pointer dereferencer is further to:
receive the second offset of the one or more offsets and the location of the portion of the second node of the data structure; and
add the second offset to the second pointer to determine the location of the portion of the third node of the data structure.

20. A non-transitory machine readable medium including information to represent structures, when manufactured, to be configured to:
receive, at a first router, a location of a portion of a first node of a data structure, the data structure to be stored among a plurality of storage elements, the first node to be stored in a first storage element;
obtain a first pointer of the first node of the data structure from the first storage element;
in response to obtaining the first pointer from the first storage element, determine, based on the first pointer, a location of a portion of a second node of the data structure, the second node to be stored in a second storage element; and
send the location of the portion of the second node of the data structure to a second router that is to access the portion of the second node from the second storage element wherein the second node of the data structure is to store a second pointer, wherein the first pointer has a value that is different from a value of the second pointer.

* * * * *